United States Patent [19]
Mabuchi et al.

[11] 4,259,809
[45] Apr. 7, 1981

[54] ROTATING UNIT

[75] Inventors: Kenichi Mabuchi; Tatuo Katunuma, both of Matsudo, Japan

[73] Assignee: Mabuchi Motor Co. Ltd., Tokyo, Japan

[21] Appl. No.: 962,931

[22] Filed: Nov. 22, 1978

[30] Foreign Application Priority Data

Dec. 7, 1977 [JP] Japan ............................ 52-146905

[51] Int. Cl.³ .............................................. A63H 17/00
[52] U.S. Cl. ........................................ 46/249; 46/248; 46/269; 74/413; 74/421 A
[58] Field of Search ............... 46/248, 249, 250, 251, 46/264, 269; 310/83; 74/413, 421 A

[56]            References Cited
        U.S. PATENT DOCUMENTS

| 2,026,006 | 12/1935 | Wennerstrom | 74/421 A |
| 2,362,998 | 11/1944 | Harshberger | 310/83 UX |
| 3,782,215 | 1/1974 | Moody | 74/413 X |
| 3,914,899 | 10/1975 | Mabuchi | 46/249 |

Primary Examiner—Gene Mancene
Assistant Examiner—Mickey Yu

[57]                ABSTRACT

A rotating unit having a rotating wheel on the internal circumference of which a gear is formed, a drive motor to the rotating shaft of which a pinion gear is fixed, an intermediate gear in mesh with the gear of the rotating wheel and the pinion gear of the drive motor, and characterized in that the reduction gear mechanism is simplified by causing the drive motor to drive the rotating wheel via the intermediate gear with the consequence that the volume and weight of the rotating unit is reduced, and that the rotating shafts of the rotating wheel and the drive motor are adapted to be in alignment with each other.

8 Claims, 4 Drawing Figures

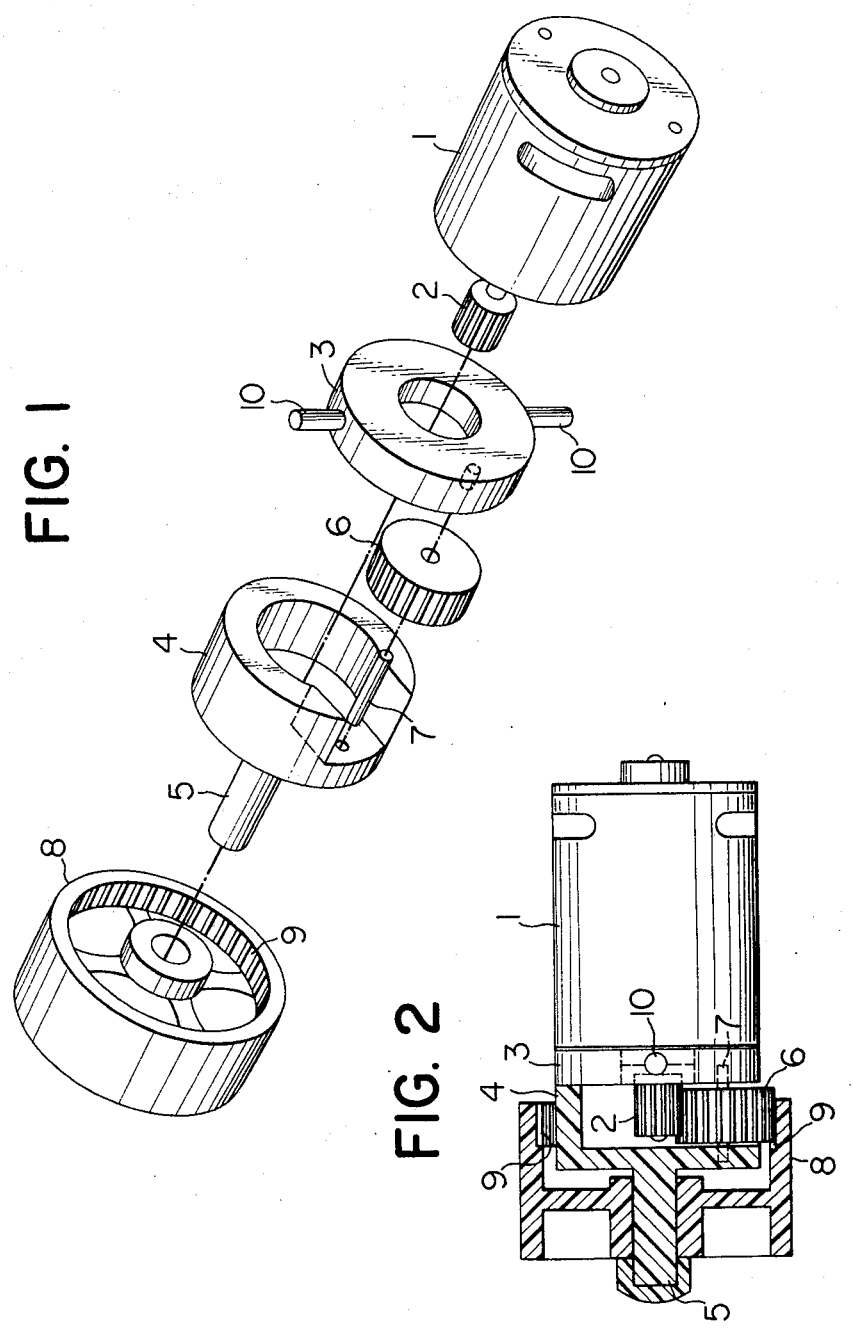

ROTATING UNIT

BACKGROUND OF THE INVENTION

1. Field of the Invention

This invention relates generally to a rotating unit, and more specifically to a rotating unit constructed so that a rotating wheel is driven by a drive motor through the use of a reduction gear mechanism wherein the reduction gear mechanism is simplified to reduce the size and weight of the mechanism by forming a gear on the internal circumference of the rotating wheel, and the rotating shafts of the rotating wheel and the drive motor are adapted to be in alignment with each other.

2. Description of the Prior Art

In most devices for driving a rotating wheel through the use of a reduction gear mechanism, the rotating axes of the drive motor and the rotating wheel are usually not in alignment with each other. Particularly, in a simplified reduction gear mechanism with reduced number of gears, the distance between the rotating shafts of the rotating wheel and the drive motor tends to increase. The increased distance between the rotating shafts results in an increase in the size of the reduction gear mechanism. To reduce the size of the rotating unit, therefore, it is desirable to make the rotating axes of the rotating wheel and the drive motor in alignment with each other. To attain this, a reduction gear device using planetary gears has often been used. The planetary gear type reduction gear devices, however, have problems such as wear of the planetary gears and higher cost. Particularly, for use in a model airplane, a small-sized, light and inexpensive rotating unit the gravity center of which is located as near as possible the extension of the rotating axis of the rotated member is desired.

SUMMARY OF THE INVENTION

It is an object of the present invention to provide a rotating unit integrally constructed to a rotating wheel, a reduction gear device and a drive motor wherein the reduction gear device is simplified by forming a gear on the internal circumference of the rotating wheel, with the consequence that the size, weight and cost of the rotating unit are reduced.

It is another object of the present invention to provide a rotating unit of high stability by making the rotating axes of the rotating wheel and the drive motor in alignment with each other so that the gravity center is located as near as possible the extension of the rotating axis of the rotating wheel.

It is still another object of the present invention to provide a rotating unit suitable for use as a powerplant for a model airplane by fixing a propeller to the rotating wheel.

These and other objects and advantages of the present invention will be better understood with reference to the accompanying drawings in conjunction with the detailed description of the invention.

BRIEF DESCRIPTION OF THE INVENTION

FIG. 1 is an exploded perspective view of assistance in explaining a rotating unit embodying this invention.

FIG. 2 is an assembly diagram of the rotating unit shown in FIG. 1.

DETAILED DESCRIPTION OF THE EMBODIMENTS

Figure 3:
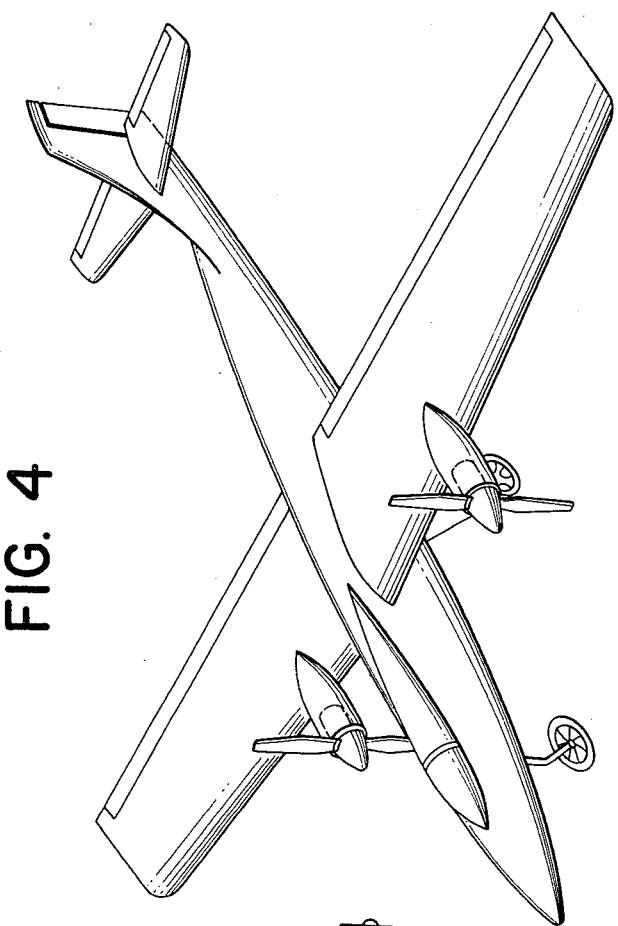
FIG. 3 shows an example in which the rotating unit of this invention is incorporated.

A rotating unit embodying this invention comprises a drive motor 1, a pinion gear 2, a gear box mount 3, a gear box 4, a wheel supporting shaft 5, an intermediate, idler gear 6, an intermediate idler gear shaft 7, a rotatable wheel 8, a ring gear 9, a king pin 10, a propeller 11, a first spinner 12, a second spinner 13 and a bearing 14.

In FIG. 1, which is an exploded perspective view of a rotating unit embodying this invention, the pinion gear 2 is fixed to the rotating shaft of the drive motor 1. The pot-shaped gear box 4 is concentrically fixed to the drive motor 1 with the gear box mount 3 interposed in between. On the external surface of the end face of the gear box 4 that is opposite to the drive motor 1, the wheel supporting shaft 5 is integrally formed with the gear box 4 and is arranged concentrically with the rotating axis of the drive motor 1. The idler gear 6 which is in mesh with the pinion gear 2 and which is partially exposed to the outside of the gear box 4 is rotatably fitted to the gear box 4 on the idler gear shaft 7. On the internal surface of the rotating wheel 8 which is loosely mounted on the wheel supporting shaft 5, the ring gear 9 and that is in mesh with the idler gear 6 is formed. The rotating wheel 8 is loosely mounted on the wheel supporting shaft 5, with the ring gear 9 formed on the internal circumference of the rotating wheel 8 being in mesh with the idler gear 6.

Figure 4:
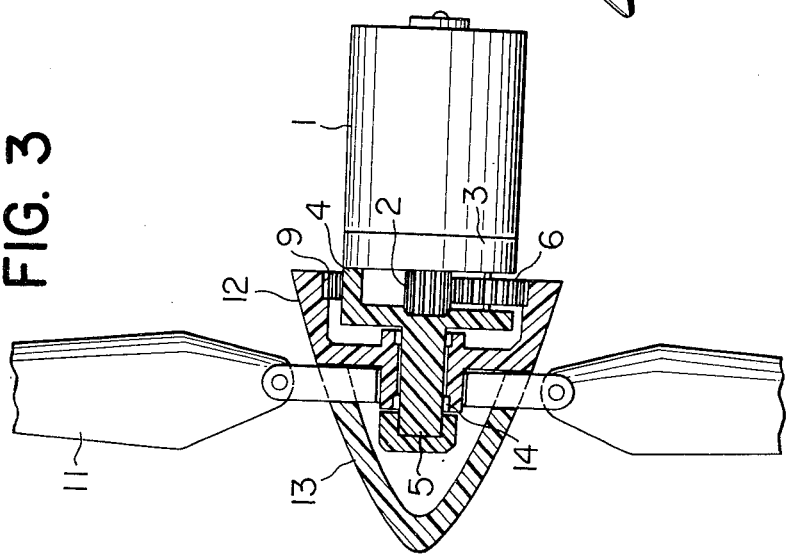
FIG. 4 is a perspective view of a model airplane in which the rotating units shown in FIG. 3 are used.

The rotating unit of this invention assembled in the aforementioned manner is shown in FIG. 2. In FIG. 2, the rotating wheel 8 which is loosely mounted on the wheel supporting shaft 5 is driven by the drive motor 1 through the pinion gear 2, the intermediate idler gear 6 and the ring gear 9. Thus, the rotating wheel 8 rotates in coaxial alignment with and in the same angular direction as the rotating axis of the drive motor 1. In installing the rotating unit to an apparatus for which the rotating unit is used, an appropriate means may be taken depending on the use and purpose of the rotating unit. In the embodiment shown in FIGS. 1 and 2, king pins 10 for supporting the rotating unit are provided on the external circumference of the gear box mount 3 at symmetrical locations with respect to the center of the gear box mount 3. The rotating wheel 8 may be formed into a desired shape depending on the use and purpose of the rotating unit of this invention. FIGS. 3 and 4 show a rotating unit embodying this invention used as a powerplant for a model airplane. In FIG. 3, a propeller 11 is fixed to a first spinner section corresponding to the rotating wheel 8 shown in FIG. 2, and a second spinner section formed in a shape shown in FIG. 3 to reduce air resistance is provided. Needless to say, a ring gear 9 in mesh with the idler gear 6 is formed on the internal circumference of the first spinner section 12. The first spinner section 12 is fitted to the wheel supporting shaft 5 through the use of a bearing 14 to reduce frictional resistance during rotation. FIG. 4 shows an example of a model airplane to which the rotating unit shown in FIG. 3 is fixed with an appropriate means. When the rotating unit of the present invention is used for a model airplane, the reduced size and simplified construction of the rotating unit offer various advantages in that the whole assembly may be made lighter in weight and the gravity center of the rotating unit can be located approximately on the extension of the rotating axis.

As described above, this invention makes it possible to provide a rotating unit integrally constructed of a rotated member, a reduction gear device and a drive motor, which is made small-sized by arranging the rotating axes of the rotated member and the drive motor in alignment with each. The rotating unit of this invention has various advantages such as simplified construction, light weight, low price and improved stability due to the gravity center being located approximately on the extension of the rotating axis.

Having described this invention as related the embodiments shown in the accompanying drawings, it is obvious that this invention is not limitied to the embodiments shown, and that various changes and modifications may be made in the invention without departing from the spirit and scope thereof.

What is claimed is:

1. An electric, motor-driven model airplane having a drive motor including a rotatable output shaft; a propeller coupled to and driven by said drive-motor; spinner means positioned coaxially with respect to said drive motor output shaft for supporting said propeller, said spinner means including a first, rotatable spinner section having a gear formed on the internal surface thereof; there being further included a pinion gear fixed to and driven by said rotatable output shaft of said drive motor; an idler gear in meshing engagement with and driven by said pinion gear; a gear box positioned internally of said first spinner section and said gear formed on the internal surface thereof; said gear box having an idler gear shaft for rotatably supporting said idler gear with a part of said idler gear being exposed to the outside of said gear box; a wheel shaft formed integrally with said gear box for rotatably supporting said first spinner section, said gear box being fixed to said drive motor with said idler gear being supported by the meshing engagement thereof with said pinion gear, said first spinner section being supported by the meshing engagement of said idler gear with said gear formed on the internal surface of said first spinner section; a hollow extension formed integrally and coaxially with said first spinner section for supporting said wheel shaft; bearing means provided between the internal surface of said hollow extension and said wheel shaft; and a second coaxial spinner section positioned contiguously and for rotation together with said first spinner section to cover said hollow extension.

2. The electric, motor-driven set forth in claim 1 characterized in that the gear box is fixed to the drive motor through the use of a gear box mount.

3. An electric, motor-driven model airplane having a drive motor including a rotatable output shaft; a propeller coupled to and driven by said drive motor; spinner means positioned coaxially with respect to said drive motor output shaft for supporting said propeller, said spinner means including a first, rotatable spinner section having a gear formed on the internal surface thereof, there being further included a pinion gear fixed to and driven by said output shaft of said drive-motor; an idler gear in meshing engagement with and driven by said pinion gear; a wheel shaft positioned coaxially with respect to said drive-motor output shaft for rotatably supporting said first spinner section, said idler gear being supported by the meshing engagement thereof with said pinion gear, said first spinner section being supported by the meshing engagement of said idler gear with said gear formed on the internal surface of said first spinner section; a hollow extension formed integrally and coaxially with said first spinner section for supporting said wheel shaft; bearing means provided between the internal surface of said hollow extension and said wheel shaft; and a second coaxial spinner section positioned contiguously and for rotation together with said first spinner section to cover said hollow extension.

4. The electric, motor-driven model airplane as set forth in claim 3 wherein there is further included a gear box positioned internally of said first spinner section and having an idler gear shaft for rotatably supporting said idler gear with a part of said idler gear being exposed to the outside of said gear box.

5. The electric, motor-driven model airplane as set forth in claim 4 wherein said gear box is formed integrally with said wheel shaft.

6. The electric, motor-driven model airplane as set forth in claim 3 wherein said gear box is fixed to said drive motor through the use of a gear box mount.

7. The electric, motor-driven model airplane as set forth in claim 3 wherein the combination of said first and said second spinner sections define a smooth, external aerodynamic shape for reducing air resistance.

8. The electric, motor-driven model airplane as set forth in claim 3 characterized in that the gravity center thereof is located as near as possible to the axis of said hollow extension.

* * * * *